United States Patent
Deylitz et al.

(10) Patent No.: US 7,034,233 B2
(45) Date of Patent: Apr. 25, 2006

(54) DEVICE FOR CONTROLLING A BLOCKING MECHANISM OF AN ELECTRIC SWITCH IN A SWITCH CELL

(75) Inventors: Erhard Deylitz, Berlin (DE); Stefan Losch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/505,076

(22) PCT Filed: Feb. 20, 2003

(86) PCT No.: PCT/DE03/00620

§ 371 (c)(1),
(2), (4) Date: Aug. 20, 2004

(87) PCT Pub. No.: WO03/073573

PCT Pub. Date: Sep. 4, 2003

(65) Prior Publication Data

US 2005/0161307 A1     Jul. 28, 2005

(30) Foreign Application Priority Data

Feb. 21, 2002   (DE) .......................... 202 02 927 U

(51) Int. Cl.
*H01H 9/20* (2006.01)

(52) U.S. Cl. ................... 200/50.01; 200/50.4; 361/605

(58) Field of Classification Search .... 200/50.01–50.4; 361/605–618
See application file for complete search history.

(56) References Cited

U.S. PATENT DOCUMENTS

| | | | |
|---|---|---|---|
| 4,491,896 A * | 1/1985 | Rickmann | 361/609 |
| 5,912,444 A | 6/1999 | Godesa | |
| 6,031,192 A * | 2/2000 | Liebetruth | 200/50.21 |
| 6,265,678 B1 * | 7/2001 | Robbins et al. | 200/50.21 |
| 6,445,570 B1 * | 9/2002 | Leccia | 361/605 |
| 6,838,626 B1 * | 1/2005 | Deylitz et al. | 200/50.21 |

FOREIGN PATENT DOCUMENTS

| | | |
|---|---|---|
| DE | 44 20 580 C1 | 11/1995 |
| DE | 44 20 581 C1 | 11/1995 |
| DE | 195 03 64 C1 | 7/1996 |
| WO | WO 02/087040 A1 * | 10/2002 |
| WO | WO 03/073573 A2 * | 9/2003 |

* cited by examiner

*Primary Examiner*—Kyung Lee
(74) *Attorney, Agent, or Firm*—Harness, Dickey & Pierce, P.L.C.

(57) ABSTRACT

A device is for controlling the movement of a blocking mechanism in an electric switch which is displaceably arranged in a switch cell. The device includes a push element and an oblique surface, whereby the oblique surface extends in the fitting position of the device in the direction of the travel of the switch and the push element can be maintained in a displaceable manner dependent on the position of a door of the switch cell in the switch cell. The push element co-operates with the oblique surface, acting on the blocking mechanism in such a way that the blocking mechanism is located in a release position when the door is closed and in a blocking position when the door is open. The device can be constructed in a simple manner by virtue of the fact that the oblique surface is inclined in a perpendicular position with respect to the direction of travel of the switch and the displacement path of the push element extends in a transversal manner with respect to the direction of travel.

6 Claims, 3 Drawing Sheets

DEVICE FOR CONTROLLING A BLOCKING MECHANISM OF AN ELECTRIC SWITCH IN A SWITCH CELL

This application is the national phase under 35 U.S.C. § 371 of PCT International Application No. PCT/DE03/00620 which has an International filing date of Feb. 20, 2003, which designated the United States of America, which published as WO 03/073573 A2 on Sep. 4, 2003 and which claims priority on German Patent Application number DE 202 02 927.1 filed Feb. 21, 2002, the entire contents of which are hereby incorporated herein by reference.

FIELD OF THE INVENTION

The invention generally lies in the field of electric switches, such as those arranged in such a way that they can be made to travel in a switchgear cell provided with a door. Further, it generally lies in the field of electric switches to be used for structurally designing a device for controlling a blocking mechanism of the switch in dependence on the position of the door of the switching cell. The device may have a push element and an oblique surface, with the oblique surface extending in the direction of the travelling path of the switch when the device is in the installed position, and with the push element being held displaceably in the switchgear cell in dependence on the position of the door of the switchgear cell. Further, the push element may co-operate with the oblique surface, acting on the blocking mechanism in such a way that the blocking mechanism is in a release position when the door is closed and in a blocking position when the door is open.

BACKGROUND OF THE INVENTION

A device for an electric switch formed as a low-voltage circuit-breaker is known from German Patent Specification 195 03 624 C1. In the case of this known device, one end of a push element formed as a push rod is supported under spring force on the door by way of a pressure piece fastened to the door of the switchgear cell. In this case, the push rod is arranged in a guiding tube, which is provided with a slit front part.

The pressure piece engages in this slit front part. When the door is closed, the other end of the push rod rests on the lower end of the oblique surface, inclined in the direction of the travelling path of the switch, in such a way that it assumes a relatively lowered position with respect to a sensing angle of the blocking mechanism and the blocking mechanism is consequently in a release position.

In this release position, the travelling mechanism of the switch is released for actuation. During opening of the door, the pressure piece leaves the slit front part of the guiding tube. The push rod follows this movement under the influence of the spring force until the other end of the push rod reaches the upper end of the oblique surface, and consequently achieves a relatively raised position. In this case, the sensing angle is pivoted, and the blocking mechanism is thereby transferred into its blocking position. In this blocking position, the travelling mechanism of the switch is blocked to prevent actuation.

SUMMARY OF THE INVENTION

An embodiment of the invention includes an object of structurally designing a device for controlling the blocking mechanism in such a way that it is more simple.

According to an embodiment of the invention, an object may be achieved by the oblique surface being inclined transversely in relation to the direction of the travelling path of the switch and by the path of movement of the push element extending obliquely in relation to the direction of the travelling path.

In such a configuration of a novel device of one embodiment—in which a component of the path of movement of the push element runs transversely, i.e. at right angles, in relation to the direction of the travelling path of the switch—the actuating element can be acted on directly by the push element, by way of a wedge action on the oblique surface, without additional elements that transfer the movement of the push element onto the blocking mechanism.

A preferred embodiment of a device provides that the oblique surface is formed on the push element. A device formed in this way can be used for switches with differently arranged blocking mechanisms, can be produced easily—for example in the form of a sheet-metal part—and can be retrofitted without major modifications of the switchgear cell or of the push-in frame arranged in the switchgear cell. In particular, no additional oblique surfaces have to be provided in the switchgear cell or in the push-in frame of the switch.

A device is preferably provided in switchgear cells in which an electric switch is arranged such that it can travel and has the blocking mechanism to be controlled for blocking a travelling mechanism of the switch.

A device formed according to an embodiment of the invention and a switchgear cell provided with such a device are represented in FIGS. 1 to 6.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
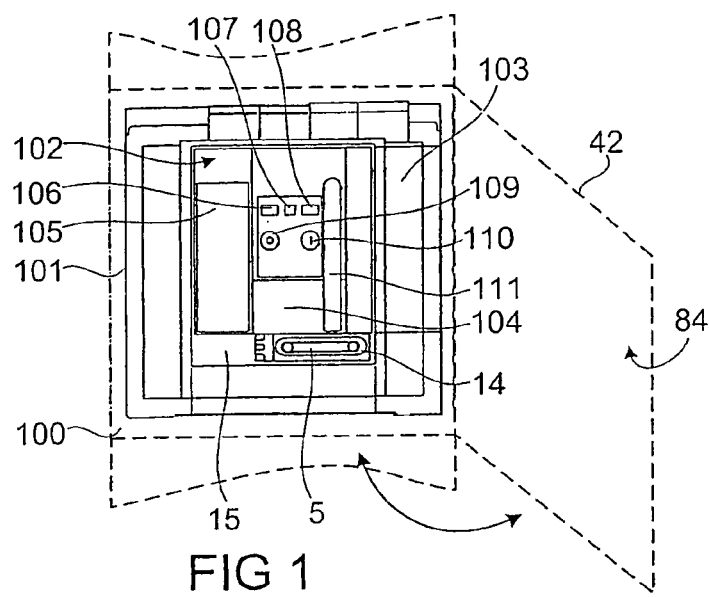
FIG. 1 shows a front view of a switching point with a push-in frame, arranged in which is a low-voltage circuit-breaker, which has a recess for a crank handle of a travelling mechanism.

According to FIG. 1, a push-in frame 101 is arranged in a switchgear cell 100 of a switchgear cabinet or a switching station, a low-voltage circuit-breaker 102 being arranged in such a way that it can be made to travel in a known way in the push-in frame 101. The low-voltage circuit-breaker 102 withdrawn in the push-in frame 101 (cf. also FIG. 6) has a housing 103 (cf. also FIG. 6) for receiving a switching pole subassembly and a control panel 104, which is fixed to the front side of the housing 103, forms the front side of the switch and by which an operating mechanism and further parts of the switch are covered.

Arranged on the control panel 104 are an overcurrent trip 105, operating and indicating elements 106 to 110, a hand-wound mechanism lever 111 for tensioning a spring store of the operating mechanism. A crank handle 5 is also included, which can be lowered into a recess 14 for actuating a drive shaft 3 (cf. FIGS. 3 and 4) of a travelling mechanism 1 (cf. FIGS. 2 to 5).

Figure 2:
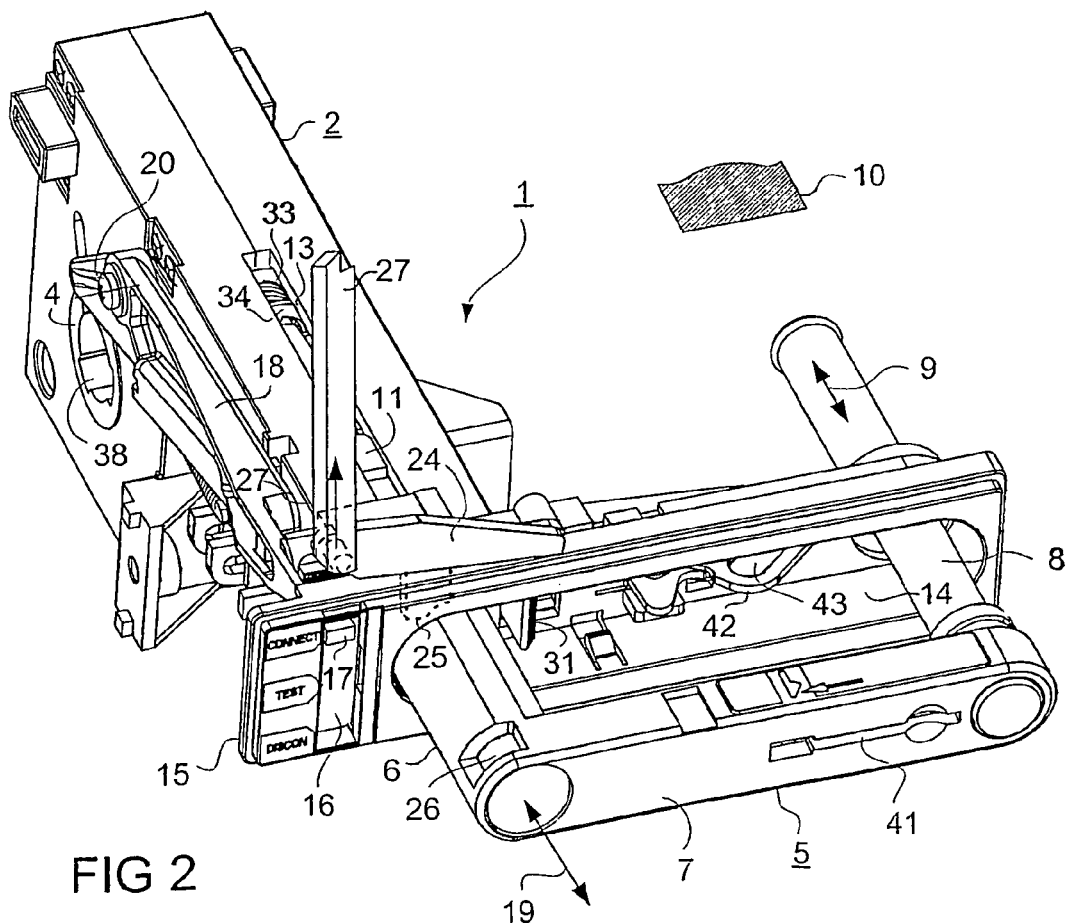
FIG. 2 shows the travelling mechanism of the low-voltage circuit-breaker according to FIG. 1 as a subassembly.
Figure 3:
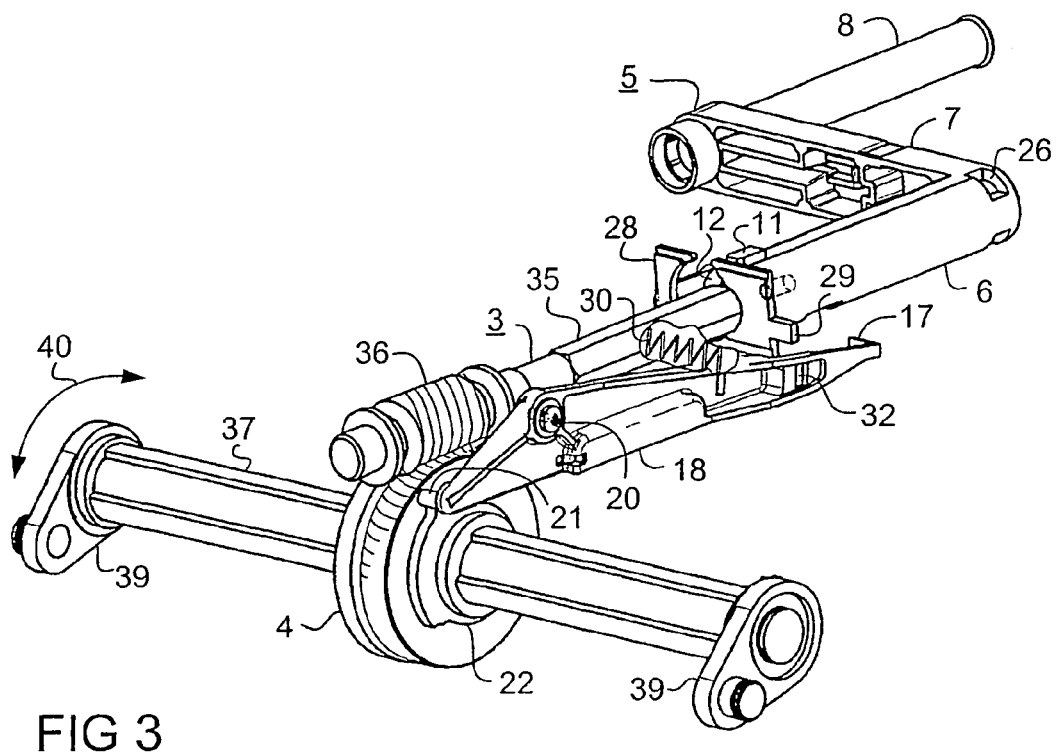
FIG. 3 shows the travelling mechanism according to FIG. 2, but without a housing and without the recess for the crank handle, a travelling shaft of the travelling mechanism being located in the release position of the associated circuit-breaker.
Figure 4:
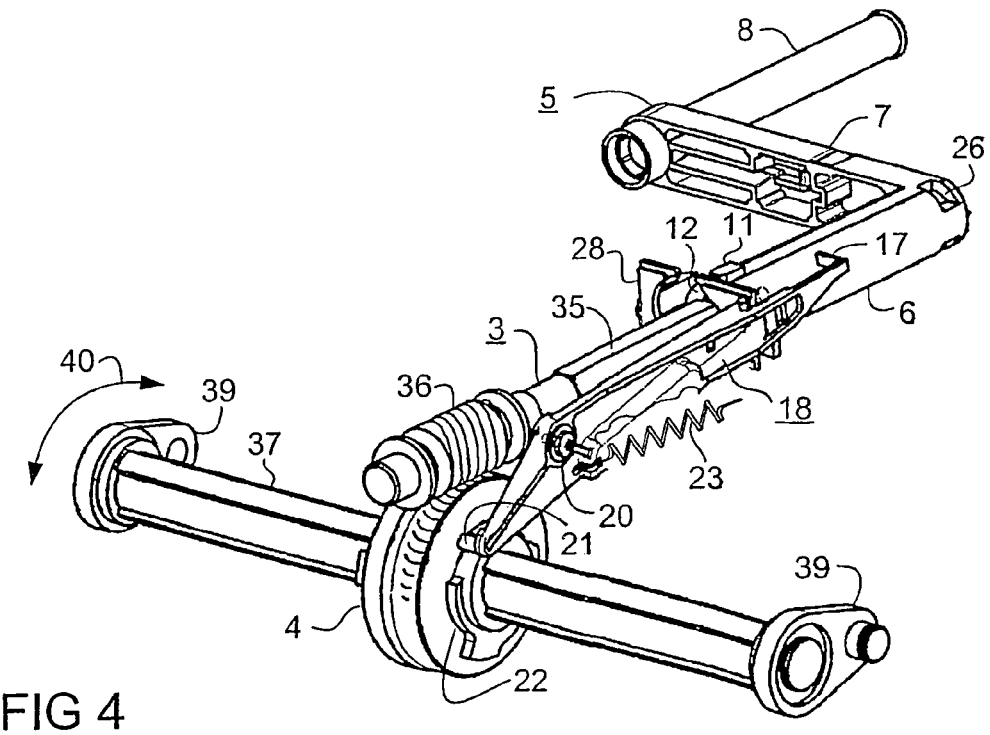
FIG. 4 shows a representation corresponding to FIG. 3 of major parts of the travelling mechanism, but in the operating position of the associated circuit-breaker

According to FIG. 2, the travelling mechanism 1 has a housing 2, which may expediently be made up of two shell-like halves, between which gear parts and further components are arranged. A turning movement exerted via the crank handle 5 is converted by the drive shaft 3 (cf. FIGS. 3 to 4) into a rotation of a travelling shaft 37 (FIGS. 3 and 4). Arranged on the drive shaft 3 for this purpose is a worm 36 (cf. FIGS. 3 and 4), which is in engagement with a gear wheel 4.

The longitudinal axes of the drive shaft 3 and of the travelling shaft 37 are at right angles to one another. The travelling shaft 37 is not fixedly connected to the travelling mechanism 1, but is displaceable in a profile opening 38 of the gear wheel 4 which is adapted to the profile of the travelling shaft 37. In this way, the travelling mechanism 1 can be used for circuit-breakers of different sizes and is not tied to a specific position along the travelling shaft 37.

Attached to the ends of the travelling shaft 37 in a known way are travelling cranks 39 (cf. FIGS. 3 and 4), which interact with fixed parts somewhat in the way that is schematically shown for example in DE 44 20 580 C1 or DE 44 20 581 C1 (FIG. 1 in each case). Also not represented is the fastening of the travelling mechanism 1 to a circuit-breaker, since a person skilled in the art is familiar with this.

As already mentioned, serving for turning the drive shaft 3 mounted in the housing 2 is a crank handle 5, which, as a difference from other known travelling mechanisms (cf. the cited DE 44 20 580 C1 and DE 44 20 581 C1), cannot be removed from the drive shaft 3 but is a component part of the travelling mechanism 1. The crank handle 5 has a hollow shank 6, which engages around a hexagonal shank 35 of the drive shaft 3 (FIGS. 3 and 4) and is displaceable on the drive shaft 1 along the direction of an arrow 19. Obviously, the drive shaft 3 and the shank 6 may also have other profiles, in order to produce a rotationally locked coupling which permits a longitudinal displacement.

The shank 6 bears a guiding pin 11, which engages in a guiding groove 13 provided on the housing 2. Since the guiding groove 13 is adapted to the guiding pin 11, the shank 6 can be displaced along the guiding groove 13, but without the possibility of rotation. This is only enabled when the shank 6 has been pulled out fully forward, where the guiding groove 13 opens out into an annular groove in the housing 2.

In this connection, "annular groove" is to be understood as also meaning differently shaped recesses of the housing 2 that permit a free rotation of the shank 6.

Apart from the shank 6, the crank handle 5 includes a crank arm 7, which is connected to the shank 6 (or is produced in one piece with it) and at the end of which there is an opening for receiving a grip 8. The grip 8 is displaceable in the opening parallel to the shank 6 in the direction of an arrow 9 and can be transferred by the user from the pushed-in position of rest according to FIG. 2 into a pulled-out working position, which is shown in FIGS. 3 and 4.

In the normal position or position of rest (cf. FIGS. 1 and 6), the crank handle 5 can be accommodated such that it is lowered flush in a recess formed as a receiving pocket 14. The receiving pocket 14 belongs to a control panel insert 15 (cf. FIGS. 1 and 2), which is arranged at the lower edge of the control panel 104 of the circuit-breaker 102. When the crank handle 5 is pushed into its position of rest, an end face 12 (cf. FIGS. 3 to 5) at the end of the shank 6 comes to bear against a supporting ring 34, which is loaded by a stop spring 33 (cf. FIG. 5). The stop spring 33 is a helical compression spring, which is fitted on the drive shaft 3. Subsequently, the user pushes the grip 8 through the opening located in the crank arm 7 as far as the position flush with the crank arm 7. The inner end of the grip 8 then bears against a stop 10.

In this pushed-in position of rest, the user in fact has no possible way of gripping the crank arm, because the contour of the receiving pocket 14 is adapted to the crank arm 7 with the shank 6 and the grip 8. Nevertheless, quick access is ensured if need be. This takes place by the depth of the receiving pocket being dimensioned such that it is larger by a certain amount than is required to accommodate the parts.

The user can therefore press the crank arm 7 somewhat into the receiving pocket against the force of the stop spring 33. However, the grip 8 cannot take part in this movement, because it is bearing against the fixed stop 10, and then protrudes by the same amount out of the crank arm 7. The user can then pull out the grip 8 and subsequently the crank arm 7 with the shank 6.

In a way similar to in the case of known travelling mechanisms, arranged alongside the crank handle 5 is an indicating window 16, in which an indicating device 17 for the operating position of the circuit-breaker in its push-in frame can be seen. As known, these positions—operating position, test position and disconnecting position—relate to the relative position of movable main isolating contacts and auxiliary isolating contacts, and, with a given arrangement of these isolating contacts, thereby to the position of the circuit-breaker 102 in the associated push-in frame 101. On account of the engagement of the travelling cranks 39 at the ends of the travelling shaft 37 in a fixed guide of the push-in frame 101, the angular position of the gear wheel 4 consequently forms a reliable feature for the said positions.

According to FIGS. 3 and 4, for the purposes of the indicating device, arranged on an end face of the gear wheel 4 is a control cam 22, on which a sensing pin 21 of a two-armed indicating lever 18 bears under the action of a tension spring 23 (FIG. 4). The indicating lever 18, which is pivotable about a bearing screw 20, consequently transfers the control cam 22 into a position of the indicating means 17 that can be perceived by the user in the indicating window 16 (cf. FIG. 2).

In this case, it is important that, when actuating the crank handle 5, the user can easily see when the said positions are reached. For this purpose, the control cam 22 is provided with portions of different slopes, which are shaped in such a way that, shortly after leaving one of the said positions, the indicating device in each case assume an intermediate position and indicate the following position only just before it is reached. The close proximity of the control cam 22 to the bearing screw 20 of the indicating lever 18 has the effect that relatively small deflections are transformed into movements of the indicating device 17 in the indicating window 16 that can be easily seen.

The shank 6 is protected against being unintentionally pushed into the housing 2 by a latched slide 28, which is loaded by a biasing spring 30 (FIG. 3). The latched slide 28 is guided in the front part of the housing 2 and likewise interacts with the end face 12 at the inner end of the shank 6. When the shank 6 is pulled out into its working position, the latched slide 28 snaps with one of its two edges facing the drive shaft 3 behind the end face 12 and consequently blocks the pushing-in of the shank 6. In order to release the shank 6 for pushing-in, the user is provided with an actuating lug 31 (cf. FIG. 2), which is arranged in such a way that it protrudes into the receiving pocket 14 and is therefore only accessible when the crank handle 5 is pulled out.

The latched slide 28 has an additional function in the middle position (test position) of the travelling mechanism 1. As a difference from the operating position and disconnecting position, this does not manifest itself to the user by a noticeable resistance at the crank handle due to the reaching of end stops. In order that the user can nevertheless only push the crank handle 5 in when the test position is exactly reached, the latched slide 28 is provided with a tongue 29, which laterally protrudes from the housing 2 when the actuating lug 31 is operated and a window opening arranged in the indicating lever 18 is opposite the tongue 29.

The travelling mechanisms of the known switches already have a device which prevents actuation when the circuit-breaker is switched on (DE 44 20 580 C1). For this purpose, access to the drive shaft is blocked by a protective element. In the case of the travelling mechanism according to an embodiment of the invention, access to the crank handle 5 is also denied to the user in that, with the crank arm 7 lowered in the recess 14, a first blocking mechanism that is activated for blocking the actuation of the drive shaft axially fixes the shank 6 of the crank handle 5. This takes place by a first blocking element, formed as a blocking lever 24 (cf. FIGS. 2 and 6), in connection with a blocking groove 26 (FIG. 2) arranged in the shank 6 of the crank handle and limited in the axial direction of the switch. The blocking lever 24 is in this case analogously in connection with a first actuating element, formed as a blocking rod 27 (FIG. 2), as is described in DE 44 20 580 C1.

If the preconditions for the travelling mechanism 1 to be actuated safely are satisfied, the blocking lever 24 is raised by the actuating element 27 in a way corresponding to an arrow shown in FIG. 1, a blocking lug 25 of the blocking lever 24 being pulled out from the blocking groove 26 of the shank 6. Conversely, switching on of the circuit-breaker 102 is only possible when the crank handle 5 has been pushed in again, into its position of rest in the recess 14, and consequently the blocking lug 25 on the blocking lever 24 can enter the blocking groove 26 again.

Figure 5:
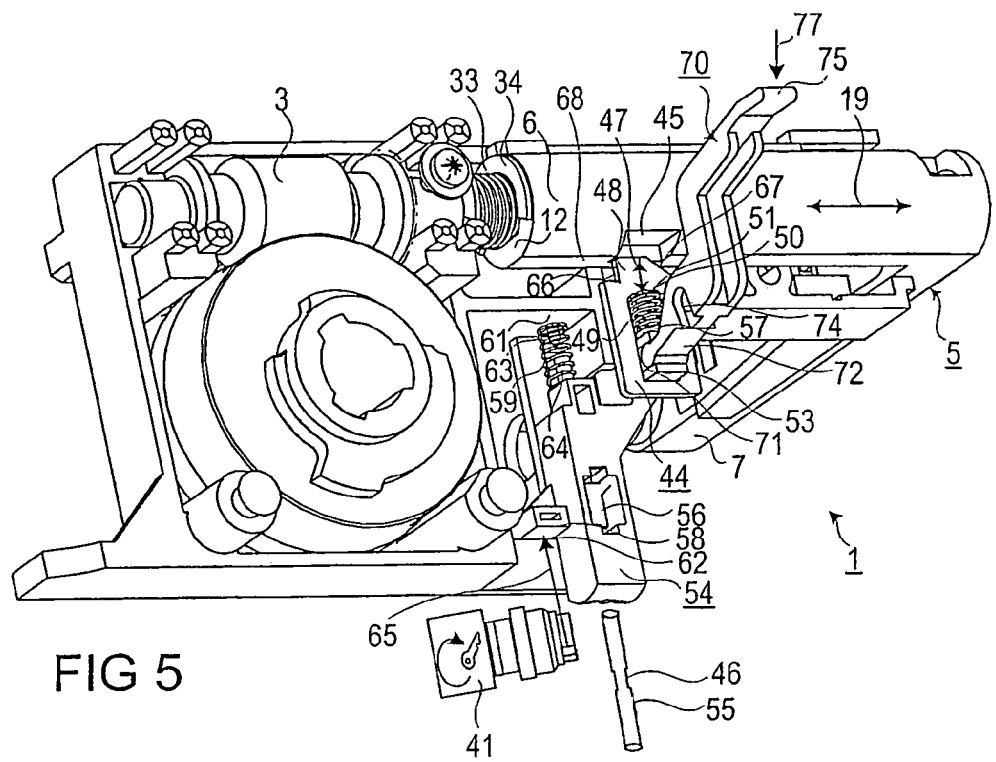
FIGS. 5 and 6 show two further representations of the travelling mechanism with a blocking mechanism and with a device for controlling the blocking mechanism.

According to FIG. 5, the travelling mechanism 1 of the novel switch has a second blocking mechanism for blocking the actuation of the drive shaft 3. This second blocking mechanism serves the purpose of preventing travelling of the switch in the push-in frame by means of a cylinder lock 41 (FIG. 5); 42 (FIG. 6) and/or when the door 42 (cf. FIG. 1) of the switchgear cell 100 is open. This second blocking mechanism also fixes the shank 6 of the crank handle 5 in its axial direction 19 when the blocking mechanism is activated for blocking and when the crank arm 7 of the crank handle is lowered in the recess 14. This takes place by a second blocking element, which is formed as blocking pawl 44, in connection with a second blocking groove 45, which is arranged in the shank 6 of the crank handle and is likewise limited in the axial direction 19 of the shank 6. The blocking pawl 44 is formed as a punched metal part and is guided displaceably in the direction of the arrow 47 perpendicularly in relation to the shank 6 on stop faces on the travelling mechanism.

Apart from a blocking lug 48, which is formed on the side facing the shank 6, it has a window-like opening 49, from one inner wall of which there is formed a first holding pin 50 for a biasing spring 51, which pin runs parallel to the direction of displacement 47 of the blocking pawl. A first arm 53 of a second actuating element 54, which is held on the travelling mechanism displaceably in the direction of displacement 47 of the blocking pawl, protrudes into the window-like opening 59 of the blocking pawl 44.

Serving for securing this second actuating element 54 on the travelling mechanism 1 is a cylindrical pin 55, which passes through inner walls, running perpendicularly in relation to the direction of displacement 47, of the actuating element 54 and fastening straps, opposite these walls, of the travelling mechanism. This occurs in the region of corresponding through-bores. For the axial fixing of the pushed-in pin, the pin has a tapered portion 46, into which a resilient lug 56 of the fastening element 54 snaps. For dismantling the actuating element 54, this lug 36 can be bent out by means of a screwdriver or a similarly narrow tool from the tapered portion 46 of the pin 55, and consequently the pin can be released for pulling out.

Formed on the first arm of the second actuating element 54 is a second holding pin 57 for the biasing spring 51. A second arm 58 of the actuating element 54 bears under the force of a restoring spring 59, which is supported on a first supporting face 61 of one of the housing halves of the travelling mechanism, against a second supporting face 62 of this housing half. For guiding the restoring spring 59, the one supporting face 61 and the actuating element 54 are respectively provided with a holding pin 63, 64.

Serving for controlling the actuating element 54 is a first, schematically represented cylinder lock 41. When this first cylinder lock 41 is closed, a lug (not represented) acts in the direction of the arrow 65 on the second arm 58 and displaces the actuating element 54 and the blocking pawl 44, which is coupled to the actuating element 54 by way of the biasing spring 51, counter to the force of the restoring spring 59 out of an OFF position (cf. FIG. 5) into an ON position in the direction of the shank 6 of the crank handle.

When the shank 6 is completely pushed in, i.e. with the crank arm 7 lowered in its recess, the second blocking groove 45 of the shank 6 is opposite the blocking lug 48 of the blocking pawl 44, so that it can enter the blocking groove 45. When it is attempted to pull the crank arm 7 out of the recess 14, the one side face of the blocking groove 45 comes to bear against a stop face 66 of the blocking lug 48 and consequently signals to the operating personnel that the travelling mechanism is blocked. A slight resistance is already sufficient here to signal the blocking of the travelling mechanism.

As a difference from the first actuating element 27 of the first blocking mechanism, the second actuating element 54 can also be displaced out of its OFF position into its ON position when the crank arm 7 is not lowered or not yet completely lowered in the recess 14. With the shank 6 pulled out completely, when the actuating element 54 is raised the blocking pawl is likewise raised and consequently protrudes into the path of movement of the shank 6. When the shank is pushed in, the end face 12 of the shank 6 slides over a sliding surface 67 of the blocking lug 48 of the blocking pawl and presses the blocking pawl 44 counter to the force of the biasing spring 51 out of the path of movement of the shank. After that, the blocking lug 48 slides along on a flattened casing portion 68 of the shank until it engages in the blocking groove 45.

For alternative actuation of the blocking pawl 44, the second actuating element is coupled to a third actuating element, formed as a two-armed lever 70. For the coupling attachment, the second actuating element 54 has at the free end of its first arm 53 a U-shaped recess 71, into which a first arm 72 of the two-armed lever 70 engages. This two-armed lever can be pivoted about a fixed bearing screw (not represented), which passes through a bore 74 of the lever 70. The second lever arm 75 of the lever 70 can be actuated by way of a pawl 73 of the cylinder lock 42 (cf. FIG. 6) in the direction of the arrow 77.

Figure 6:
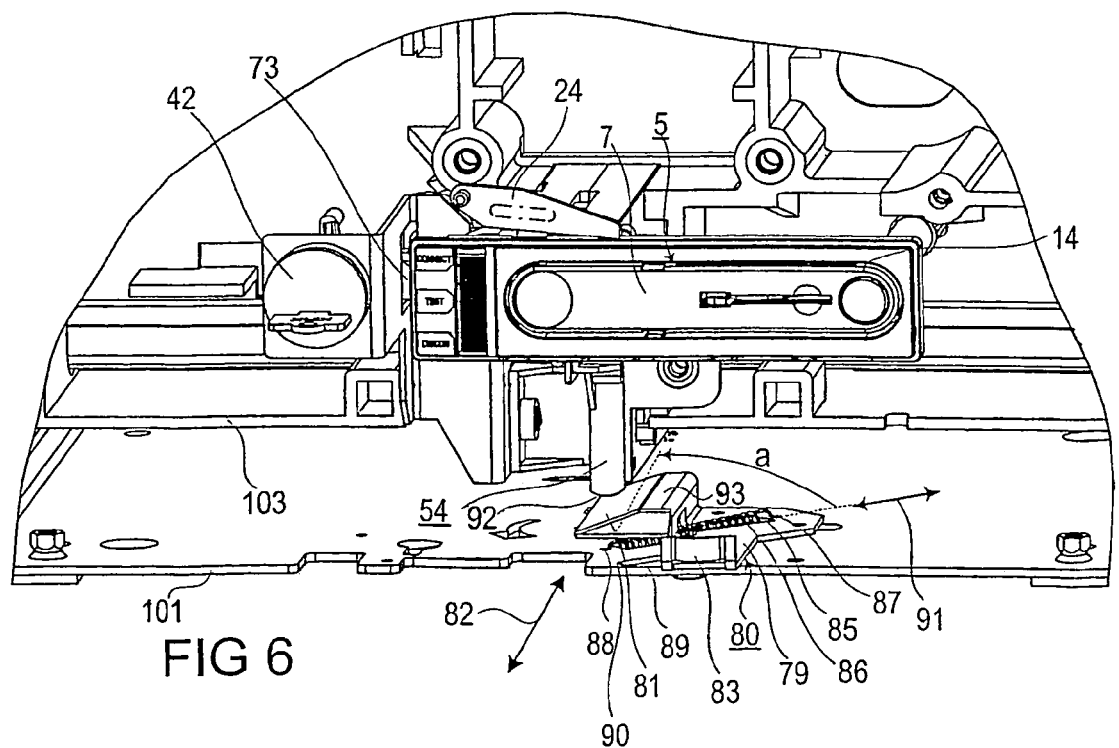

According to FIG. 6, serving for controlling the movement of the actuating element 54, and consequently for controlling the second locking mechanism, is a device which has a push element 80 provided with an oblique surface 81. This push element 80 is formed as a punched/bent metal part and has in addition to the oblique surface 81, which is inclined at right angles to the direction of the travelling path of the switch, an angled-away supporting arm 79 for bearing against the inner side 84 of the door 42 of the switchgear cell 100 (cf. FIG. 1) and a window-like opening 85, for receiving a restoring spring 86, and a bore 87, forming the abutment for one end of the restoring spring.

The angled-away end 83 of the supporting arm is curved in such a way that it bears against the inner side of the door at a point, and consequently with low friction. The window-like opening 85 extends in the operating direction 91 of the restoring spring and thereby approximately at an angle α of 45° obliquely in relation to the travelling direction 82 of the switch. The angle α between the travelling direction of the switch and the operating direction of the restoring spring should preferably be between 30 and 60 degrees.

The abutment of the other end of the restoring spring 86 is formed by a bore 88 in the push-in frame of the switch. Also formed in the push-in frame, parallel to the operating direction 91 of the restoring spring 86, are three guiding slots, forming a three-point bearing for the push element, of which only one 89 can be seen in FIG. 6 and which are respectively passed through by a guiding pin riveted onto the push element, the free ends of the guiding pins being provided with a collar, the diameter of which is made wider than the width of the guiding slots. One end of the guiding slots is respectively widened in such a way that the pins with their collar can easily be inserted into the slots. The other end of the slots respectively forms a stop 90, on which the push element is held under the force of the restoring spring when the door is open.

In this stop position of the push element, a working surface 93 which adjoins the upper end of the oblique surface is opposite a rounded-off free end 92 of the second actuating element 54, whereby the second actuating element 54 is activated in its ON position, and consequently the second blocking mechanism in its blocking position. When the door is closed, the inner side 84 of the door 42 comes to bear against the angled-away end 83 of the supporting arm 79 of the push element and displaces the push element 80 counter to the force of the restoring spring 86 obliquely in relation to the travelling direction 82 of the switch in such a way that the oblique surface 81 of the push element slides laterally on the free end of the second actuating element until the lower end of the oblique surface is opposite the free end (cf. FIG. 6). As a result, the second actuating element is released and, under the force of the restoring spring 59, assumes its OFF position, whereby the second blocking mechanism is transferred into its release position.

As an alternative to this embodiment of the device, the oblique surface may also be formed on the push-in frame of the switch, the push element then acting on the second actuating element as it slides on the oblique surface.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A device for controlling an actuating element of a blocking mechanism in a switchgear cell along a travelling path of a moveable electric switch, the blocking mechanism being in a release position, when the actuating element is in an OFF position and in a blocking position, when the actuating element is in an ON position, the device comprising:

a push element and an oblique surface, the oblique surface extending in the direction of the travelling path of the switch when the device is in an installed position, wherein the push element is displaceably held in the switchgear cell and interacts with a door of the switchgear cell, wherein the push element in cooperation with the oblique surface acts on the actuating element of the blocking mechanism so that the actuating element is in the OFF position when the door is closed and in the ON position when the door is open, wherein the oblique surface is inclined transversely in relation to the direction of the travelling path of the switch, and wherein the path of movement of the push element extends obliquely in relation to the direction of the travelling path.

2. The device as claimed in claim 1, wherein the oblique surface is formed on the push element.

3. A switchgear cell, comprising:
   an electric switch, arranged in such a way that it can travel in the switchgear cell;
   a travelling mechanism; and
   a blocking mechanism for blocking the travelling mechanism, wherein the blocking mechanism is controlled via a device as claimed in claim 2.

4. A switchgear cell, comprising:
   an electric switch, arranged in such a way that it can travel in the switchgear cell;
   a travelling mechanism; and
   a blocking mechanism for blocking the travelling mechanism, wherein the blocking mechanism is controlled via a device as claimed in claim 1.

5. A switchgear cell, comprising:
   an electric switch mounted for movement along a travelling path in the switchgear cell;
   a travelling mechanism;
   a blocking mechanism for blocking the travelling mechanism, the blocking mechanism including an actuating element; and
   a device for controlling the actuating element of the blocking mechanism, the device including,
   a push element and an oblique surface,
   the oblique surface extending in the direction of the travelling path of the switch when the device is in an installed position,
   wherein the push element is displaceably held in he switchgear cell and interacts with a door of the switchgear cell wherein the push element in cooperation with the oblique surface acts on the actuating element of the blocking mechanism so that the actuating element is in an OFF position when the door is closed and in a ON position when the door is open, wherein the oblique surface is inclined transversely in relation to the direction of the travelling path of the switch, and wherein the path of movement of the push element extends obliquely in relation to the direction of the travelling path.

6. The switchgear cell as claimed in claim 5, wherein the oblique surface of the device is formed on the push element.

* * * * *